United States Patent
Alba et al.

(10) Patent No.: US 8,113,734 B2
(45) Date of Patent: Feb. 14, 2012

(54) FIXED EYEBOLT ASSEMBLY AND INVENTORY THEREOF

(75) Inventors: Tony J. Alba, West Covina, CA (US); Phil Stranahan, Huntington Beach, CA (US)

(73) Assignee: MJT Holdings, LLC, Valdosta, GA (US)

( * ) Notice: Subject to any disclaimer, the term of this patent is extended or adjusted under 35 U.S.C. 154(b) by 28 days.

(21) Appl. No.: 12/837,387

(22) Filed: Jul. 15, 2010

(65) Prior Publication Data
US 2010/0278613 A1    Nov. 4, 2010

Related U.S. Application Data

(62) Division of application No. 10/392,431, filed on Mar. 19, 2003, now Pat. No. 7,783,519.

(51) Int. Cl.
*F16C 11/06*    (2006.01)
(52) U.S. Cl. .................. 403/89; 705/28; 705/29
(58) Field of Classification Search .......... 403/89; 705/28, 29
See application file for complete search history.

(56) References Cited

U.S. PATENT DOCUMENTS

| | | | | |
|---|---|---|---|---|
| 6,236,901 | B1 * | 5/2001 | Goss | 700/95 |
| 6,892,104 | B2 * | 5/2005 | Patil et al. | 700/95 |
| 7,194,323 | B2 * | 3/2007 | Kritt et al. | 700/97 |
| 2003/0004595 | A1 * | 1/2003 | Seimiya et al. | 700/97 |

* cited by examiner

*Primary Examiner* — Ramsey Refai
(74) *Attorney, Agent, or Firm* — Bruce A. Jagger

(57) ABSTRACT

An eyebolt assembly is provided in which a skirt member is reinforced by radially projecting diametrically extending ribs. A fixed lifting eye projects from one side of the skirt, and a mounting stud projects from the opposite side. The mounting stud is double threaded with one thread being adapted to mate with a threaded bore in the body of the eyebolt assembly, and the other thread being matched to a threaded bore in a load. The same eyebolt body can be employed with a plurality of different mounting studs, which simplifies inventorying eyebolt assemblies to meet all of the different threaded bores that may occur in different loads. Only the mounting studs need to be threaded to match the loads. The skirts are provided with striking faces so that they can be tightened and loosened by striking them with a hammer.

6 Claims, 6 Drawing Sheets

FIXED EYEBOLT ASSEMBLY AND INVENTORY THEREOF

RELATED APPLICATIONS

This application is a divisional of prior application Ser. No. 10/392,431, Filed Mar. 19, 2003 now U.S. Pat. No. 7,783,519.

The benefit of U.S. Provisional Application Ser. No. 60/365,860, filed Mar. 19, 2002, is claimed.

BACKGROUND OF THE INVENTION

1. Field of the Invention

The invention relates in general to eyebolts and, in particular, to fixed eyebolt assemblies, and to eyebolt inventory control methods.

2. Description of the Prior Art

Eyebolts of various configurations have been proposed for various purposes. See, for example, Ake U.S. Des. 275,868; Bethea U.S. Des. 286,979; Palmer U.S. Des. 309,251; Schriever U.S. Des. 360,353; Kraine U.S. Des. 415,951; and Bohli U.S. Pat. No. 3,866,873, which all relate generally to fixed eyebolts with integral washers and separately provided fasteners that mount generally centrally of the eyebolt structure. Mueller U.S. Pat. No. 3,492,033; Motz U.S. Pat. No. 4,408,941; Seidel U.S. Pat. No. 4,699,410; and Pearl U.S. Pat. No. 6,161,883, all relate generally to mounting studs that are threadabiy received in both a substrate and the mounting member. Jacobs U.S. Pat. No. 3,595,125; Burke U.S. Pat. No. 4,295,765; Freeman U.S. Pat. No. 5,125,861; Conway U.S. Pat. No. 5,730,245; Hanaway U.S. Pat. No. 5,865,416; Kwon U.S. Pat. No. 5,992,910; and Cooper U.S. Des. 172,741, all relate generally to eyebolts wherein a mounting stud is integral with and extends generally centrally from the eye of the eyebolt. Harold et al. U.S. Pat. No. 2,748,646; Mason U.S. Pat. No. 4,090,314; McWhirter U.S. Pat. No. 4,419,785; Bongiovanni et al. U.S. Pat. No. 5,320,193; and Smetz U.S. Pat. No. 5,690,457, all relate generally to eyebolt structures in which separate bolts are employed to secure the eyebolt structures to various substrates. Pearl U.S. Pat. No. 6,161,884, from the swivel hoist ring art, discloses a swivel hoist ring in which a double threaded mounting stud and a skirt with radially projecting arms is proposed. The faces of the radially projecting arms are said to be adapted to being struck with a hammer to tighten the mounting stud. Tsui et al. U.S. Pat. No. 5,056,965, from the tool bushing art, discloses a method of controlling an inventory of tooling bushings by stocking a variety of headless press fit bushings of various lengths, and a few standard bushing heads which can be assembled to the headless bushings as needed.

Fixed eyebolts that are intended to carry substantial loads, either in a lifting or tie-down configuration, frequently require removal and reinstallation in the same or different locations. Typically, special tools to accomplish such removal and reinstallation are not available or are not used. The ability to reliably install or remove an eyebolt manually with only a hammer would be advantageous. In general, fixed eyebolts are not configured to accommodate this situation. Inadequate tightening of an eyebolt to a substrate may result in a safety hazard.

Repeated or improper removal and reinstallation often damages the threads or other mounting elements by which fixed eyebolts are secured to substrates. Damaged eyebolts must be refurbished or replaced. Refurbishment generally requires that the mounting stud or other mounting components be replaced. Thus, the eyebolt body should preferably be separable from the mounting component.

Fixed eyebolts find application in a variety of different applications such as, for example, load tie-downs, load lifting, material handling, and the like. In the construction industry, fixed eyebolts are frequently secured to concrete substrates through, for example, conventional wire thread connections (see, for example the wire thread disclosed in Tsui U.S. Pat. No. 5,732,991). In heavy manufacturing industries, fixed eyebolts are frequently secured to substrates through, for example, machine or square threads. In some industries, various different threads are traditionally used for securing eyebolts to substrates. The eyebolt body is typically the same for a given load capacity, but several different thread styles or even stud diameters must be available to satisfy the requirements of various applications. If the mounting components are made integral with the body of the eyebolt, a different eyebolt is required for each different thread style.

When an eyebolt with an integral mounting component becomes damaged, the entire eyebolt is often discarded. The body of a typical eyebolt is the most expensive part of the assembly, and comprises the majority of the high grade alloy that is used in the device. High strength alloys are sometimes in short supply. The equipment that is required to process high strength alloys requires a considerable capital investment, and operational costs are significant. Minimizing the number of eyebolt bodies that must be made and stocked would significantly reduce the cost of maintaining an inventory of eyebolts. If only one eyebolt body could be stocked for each rated load, regardless of the requirements for multiple different mounting components, the costs and difficulty of maintaining an eyebolt inventory could be significantly reduced. If a particular thread style or stud diameter falls out of favor and is no longer used, all of the fixed eyebolts with these dimensions in which the mounting stud is integral with the eyebolt body must be discarded. Mounting studs can be produced quickly and relatively inexpensively, so it would not be necessary to stock a large number of such studs of any given thread style if the studs were to be made separate from the eyebolt body. The studs can be produced as the demand appears. Inventory costs could be reduced if large numbers of integral eyebolt body-mounting studs with different thread styles did not have to be produced and inventoried to meet anticipated demand.

An eyebolt, even though of a fixed design, should be capable of supporting a rated load applied from any direction. Otherwise, the installer of the eyebolt must be aware of and follow installation instructions as to the necessary orientation of the eyebolt relative to the anticipated load. Even if the installation instructions are known, and they are followed, unexpected shifts in the direction of the applied load may create a safety hazard. The necessity to orient the eye in a particular direction to accommodate a load may result in less than optimum tightening of the eyebolt, thus creating a safety hazard.

These and other difficulties of the prior art have been overcome according to the present invention.

BRIEF SUMMARY OF THE INVENTION

A preferred embodiment of an eyebolt assembly and associated inventory method according to the present invention comprises providing a plurality of fixed eyebolt bodies, all with the same nominal dimensions, for each rated load, and a plurality of different eyebolt mounting components. The eyebolt mounting components are all configured with substantially the same eyebolt body engaging elements, but individual ones of the eyebolt mounting components are configured differently to engage with different types of elements in various substrates. All of the eyebolt mounting components will mate with all of the eyebolt bodies. Where the engagement between the eyebolt bodies and the mounting components is, for example, by way of threads, all of the mounting components have substantially identical threaded portions that are adapted to mate with the threads in the eyebolt bodies. Different ones of the mounting components have other threaded portions that mate with those threads and diameters that are to be found associated with the respective substrates with which the mounting components are intended to mate. Thus, any eyebolt body may be selected at random and assembled with any mounting component. The other threaded portion of the mounting component can be selected depending upon the requirements of its intended use. The eyebolt bodies, for a given load rating, all have substantially the same nominal dimensions, including the member that engages the mounting component. It is only the mounting components that change depending upon the intended application. Preferably, the eyebolt bodies are releasably assembled to the mounting components so that the mounting components may be replaced as they become damaged or different mounting elements are required to mate with a particular substrate mounting element.

The eyebolt bodies are configured so that they will support the rated load without regard to its direction of application. To this end, the lifting loop is generally symmetrical about a plane that includes the longitudinal axis of the eyebolt assembly and bisects the lifting loop either normal to or in the plane of the loop. A skirt projects generally normal to the longitudinal axis and is adapted to bear against the surface of a substrate to which the eyebolt assembly is mounted. Also, reinforcing members that are integral with the skirt extend generally radially of the skirt on the normally upper surface of the skirt to support it against the surface of a substrate. Preferably, the reinforcing ribs extend to or at least adjacent to the periphery of the skirt. The lifting loop is preferably integral with one pair of ribs for substantially the full diametric length of the skirt. The ribs are preferably radially arrayed around the normally upper side of the skirt so as to strengthen the skirt from a load applied in any direction.

The reinforcing ribs are preferably configured so that they provide striking faces to receive hammer blows from a manually controlled hammer. The striking faces extend approximately parallel to the longitudinal axis of the eyebolt assembly, and are of sufficient extent that they can be reliably accessed by a manually controlled hammer. Any striking face that extends generally axially for less than approximately one-quarter of an inch from the normally upper surface of the skirt is generally not reliably accessible. For purposes of leverage, the striking faces should be as close to the periphery as possible, but not extend radially beyond the periphery of the skirt.

The eyebolt body is preferably releasably secured to the mounting component, for example, by way of a pin received in a cross-bore that extends through the ribs and mounting component, adhesive, or the like.

Other objects, advantages, and novel features of the present invention will become apparent from the following detailed description of the invention when considered in conjunction with the accompanying drawings.

BRIEF DESCRIPTION OF THE DRAWINGS

The present invention provides its benefits across a broad spectrum of fixed eyebolt assemblies. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration only and not limitation.

DETAILED DESCRIPTION OF THE PREFERRED EMBODIMENTS

Figure 1:
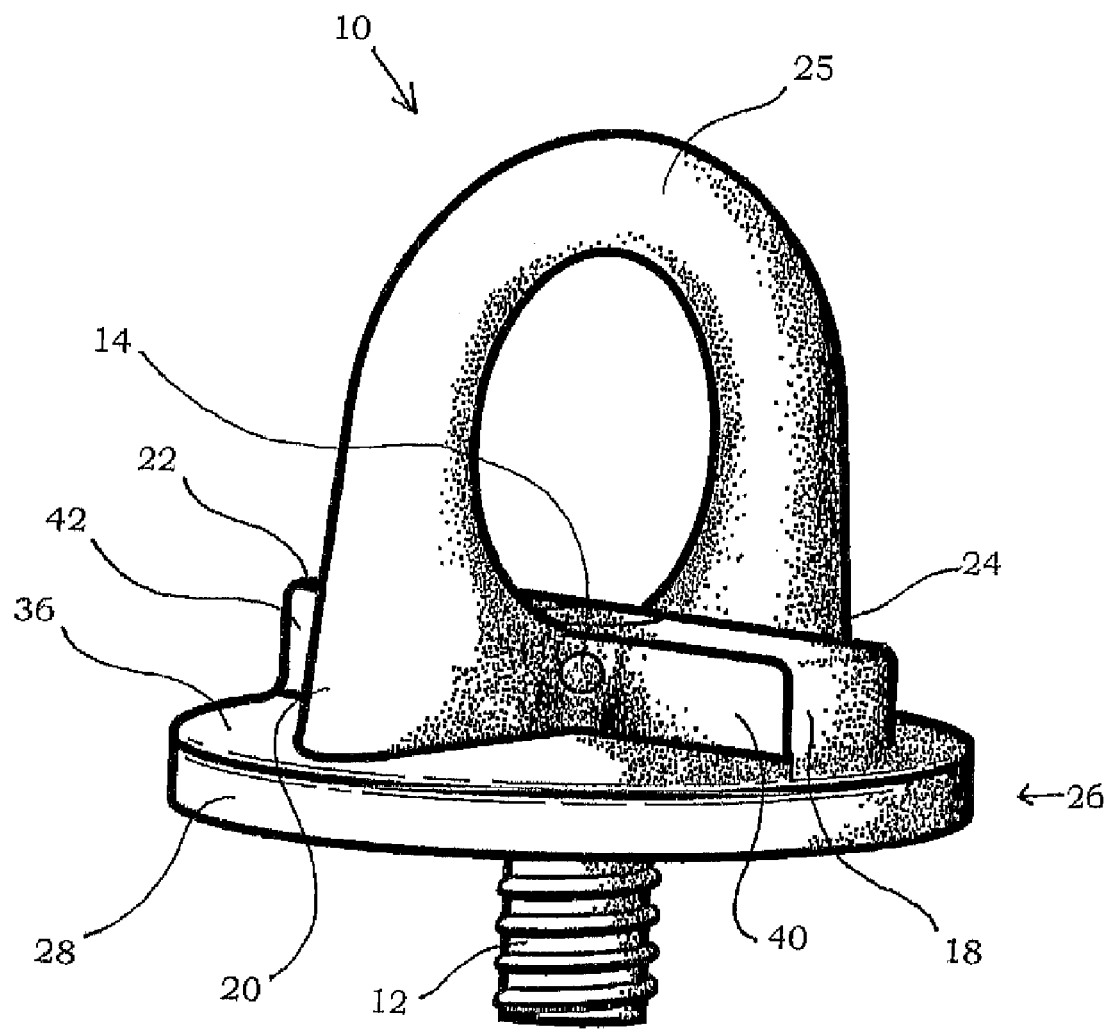
FIG. 1 is a perspective view of a fixed eyebolt and mounting stud in accordance with the present invention, the perspective view from the opposed side being an identical mirror image view.
Figure 2:
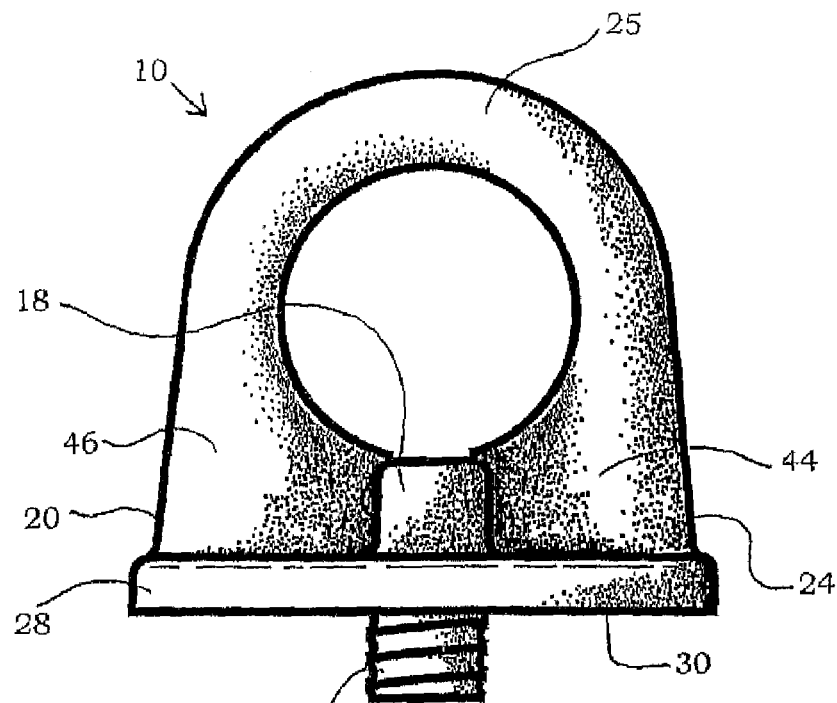
FIG. 2 is a front elevational view thereof, the opposed front elevational view being an identical mirror image view.
Figure 3:
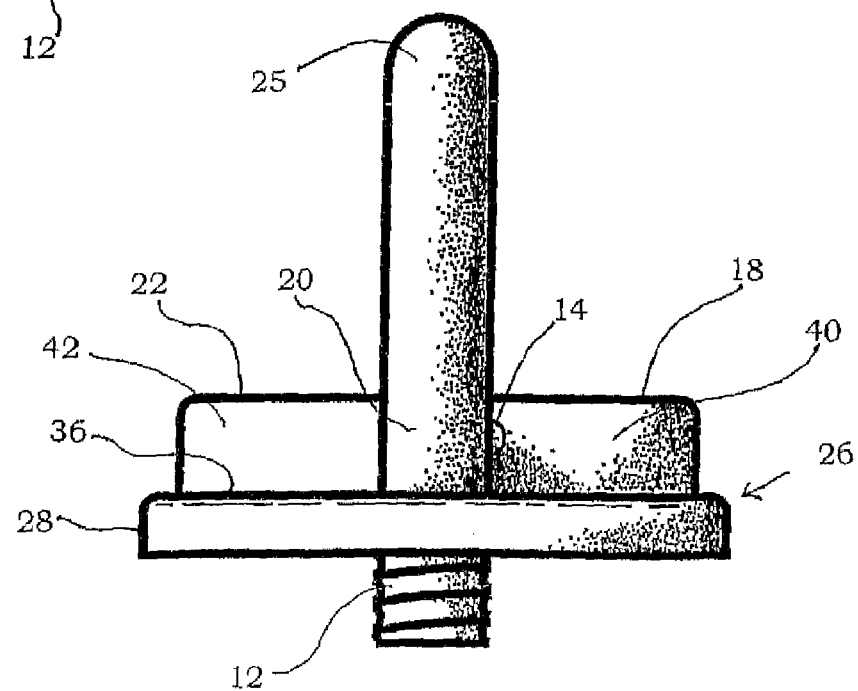
FIG. 3 is a side elevational view thereof, the opposed side elevational view being an identical mirror image view.

Referring now to the drawings wherein like reference numerals designate identical or corresponding parts throughout the several views, there is illustrated generally at 10 a fixed eyebolt assembly composed of an eyebolt body and a mounting stud 12. Preferably, mounting stud 12 is separable from the eyebolt body. To this end, if desired, a retainer pin 14 may be provided for retaining insertion in cross-bore 16. Cross-bore 16, when provided, extends through both a mounting component, for example, mounting stud 12, and at least one of the reinforcing elements, for example, the junction of rib members 18 and 20, so that the insertion of retainer pin 14 locks the mounting stud 12 and the eyebolt body together. The combination of a cross-bore and retainer pin can be replaced, as will be understood by those skilled in the art, with other securing elements. For example, the end of the mounting stud 12 can be extended up entirely through the intersection of the reinforcing elements so that its proximal end is exposed. The thusly exposed proximal end can be secured with a lock nut, a castle or like nut and pin, a releasable clamp, or the like known securing elements. The safe and secure assembly of the eyebolt body to the mounting stud is thus assured. The securing element retains the eyebolt body and mounting stud in the desired assembled configuration during use, while permitting their disassembly when desired for repair, maintenance, or reconfiguration.

Figure 4:
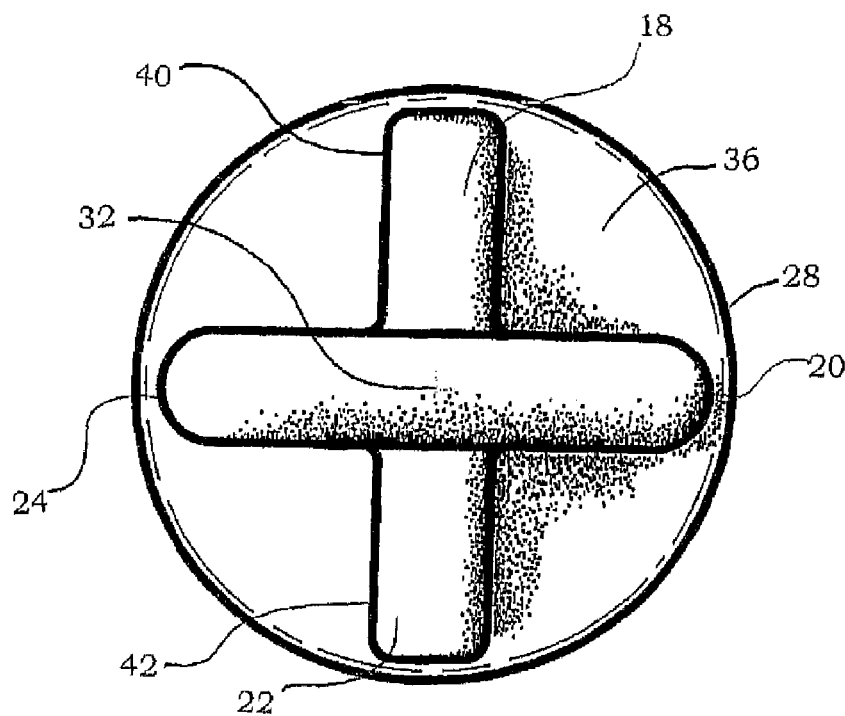
FIG. 4 is a top plan view thereof.

The eyebolt body has a longitudinal axis 32 (FIGS. 4, 5, and 8) and includes a lifting loop 25, and a base member indicated generally at 26, for example, a skirt member. Base member 26 extends generally radially and normal of axis 32, and has, for example, a generally circular plan form bounded by an outer periphery 28. Base member 26 includes a first side, which presents a generally flat bearing surface 30. The generally flat bearing surface 30 may or may not include a generally annular recess 34 (FIGS. 8 and 9) that steps up to an annular boss adjacent to outer periphery 28. Bearing surface 30 is adapted to bear against the surface of a substrate (not shown) to which the fixed eyebolt assembly 10 is mounted. Base member 26 includes a second face 36 generally opposed to first face 30. Base member 26 generally extends generally laterally of axis 32, and exhibits a thickness between the first and second faces thereof.

A threaded bore 38 (FIG. 8) is located generally in the central region of the base member 26, preferably generally concentric with longitudinal axis 32. Threaded bore 38 is accessible from first side 30 and extends at least into the thickness of base member 26 towards second side 36. Preferably, threaded bore 38 extends from first side 30 into the eyebolt body for a distance at least equal to about one and one-half times the diameter of stud 12. Preferably, threaded bore 38 is a blind hole, and its depth is controlled so that when the stud 12 is fully seated in threaded bore 38, cross-bore 16 aligns with the mating bores in stud 12 and the eyebolt body. This assists in aligning the mating bores to form cross-bore 16.

Reinforcing elements are provided integral with second side 36. Reinforcing elements take the form, for example, of generally radially extending bars or reinforcing ribs. For example, reinforcing ribs 20 and 24 together extend diametrically across second side 36 to a location adjacent to but not radially beyond outer periphery 28. Reinforcing ribs 18 and 22 together extend similarly diametrically across second side 36, and generally intersect with ribs 20 and 24 in the central region of the base member 26 to define a generally cruciform or plus shaped configuration. Each of the reinforcing ribs 18 and 22 presents at least one striking face generally adjacent to outer periphery 28. The striking face on reinforcing rib 18 is indicated at 40, and the striking face for reinforcing rib 22 is indicated at 42. The reinforcing ribs are configured so that the surfaces that are generally opposed to striking faces 40 and 42 are likewise available as striking surfaces. The respective striking faces are accessible to be struck by a manually wielded hammer for tightening or loosening the threaded mounting stud 12. Providing striking faces on reinforcing ribs 18-22 protects lifting loop 25 from potential damage from tightening or loosening hammer blows.

Lifting loop 25 is integral with base member 26 through reinforcing ribs 20 and 24. Lifting loop 25 is generally symmetrical about a plane that includes axis 32 and extends generally normal to either reinforcing ribs 18-22 or 20-24.

Mounting stud 12 is adapted to being threadably received in threaded bore 38. The thread form 48 on the proximal end of mounting stud 12 is adapted to mate with that of threaded bore 38. The thread form 50 on the distal end of mounting stud 12 is adapted to threadably engage with what ever thread may be found in a desired application. The diameters of the proximal and distal ends can be the same or different as may be desired for a particular application.

Figure 5:
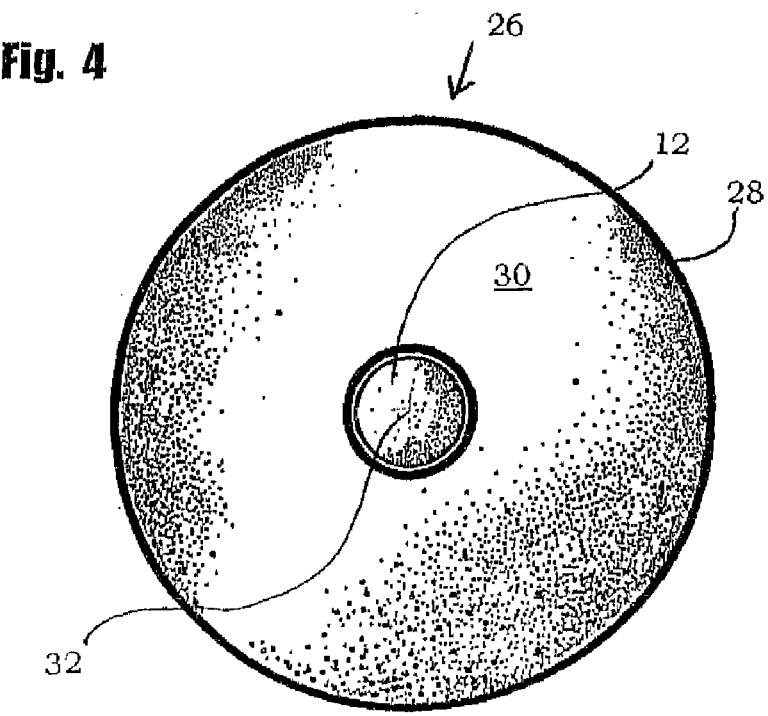
FIG. 5 is a bottom plan view thereof.
Figure 6:
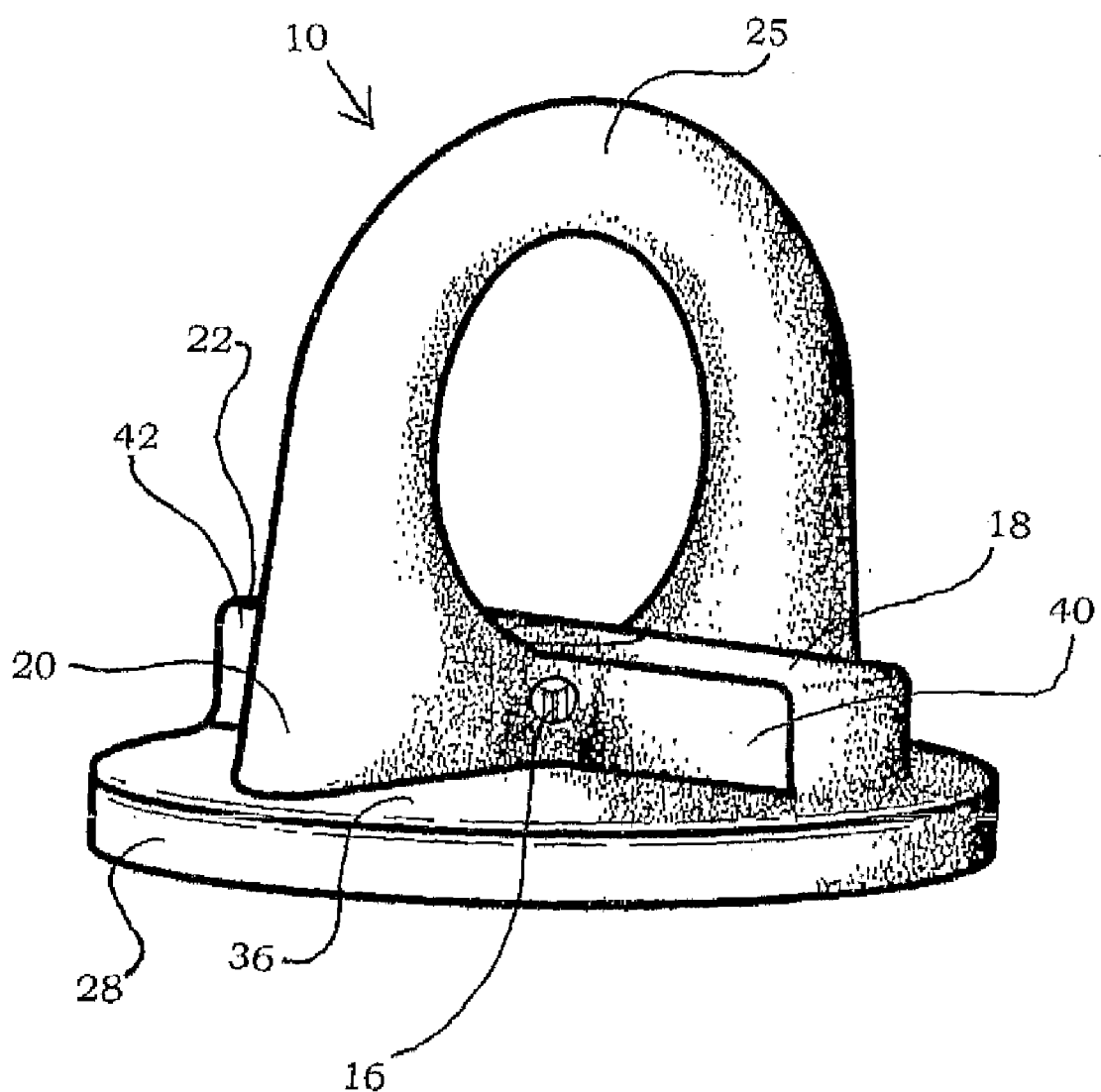
FIG. 6 is a perspective view similar to FIG. 1 without the mounting stud.
Figure 8:
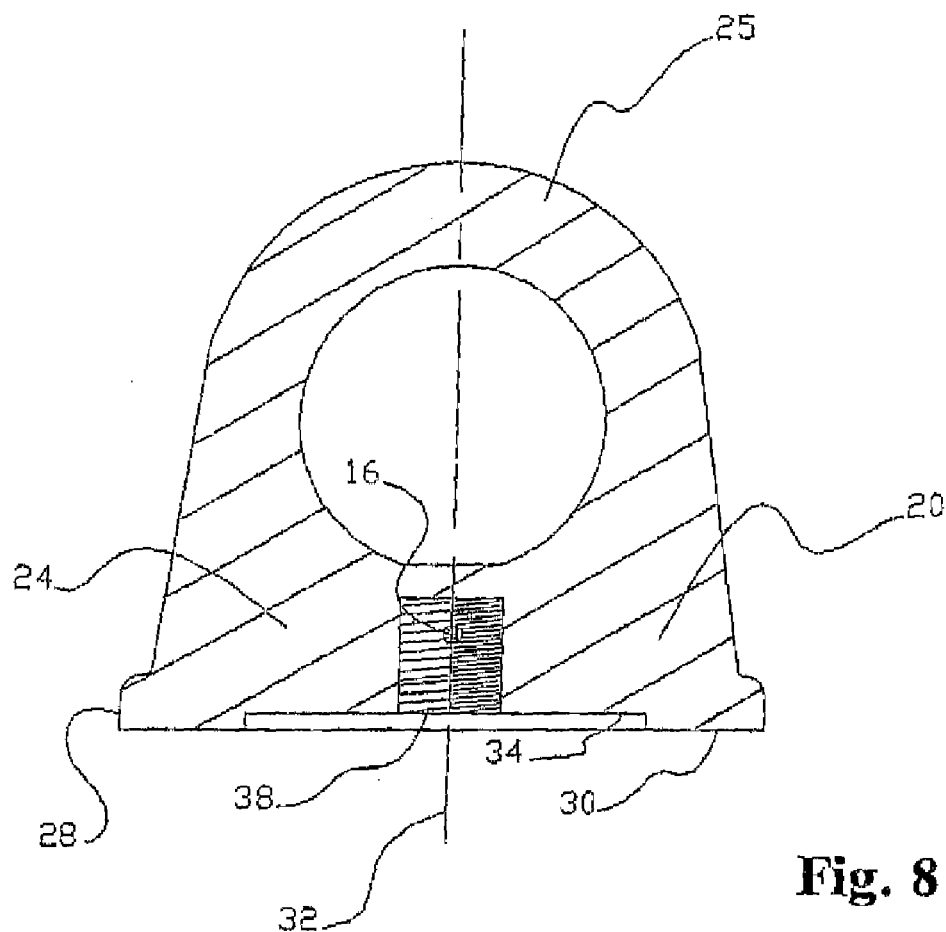
FIG. 8 is a cross-sectional view of an additional embodiment wherein the substantially flat bearing surface includes an annular boss.
Figure 7:
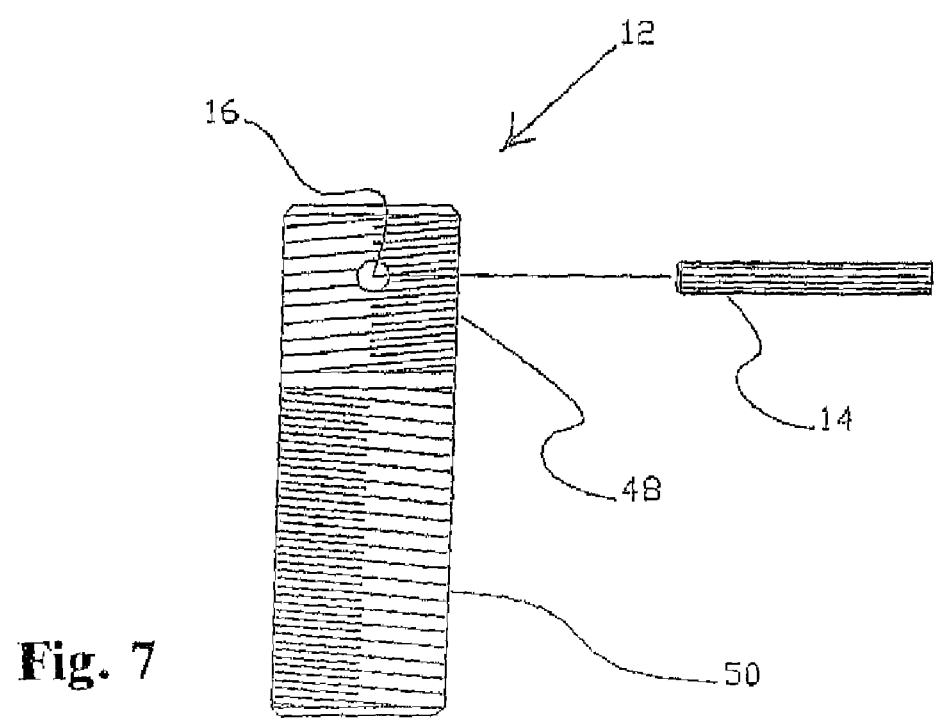
FIG. 7 is an exploded front elevational view of a dual threaded mounting stud and associated retainer pin.
Figure 9:
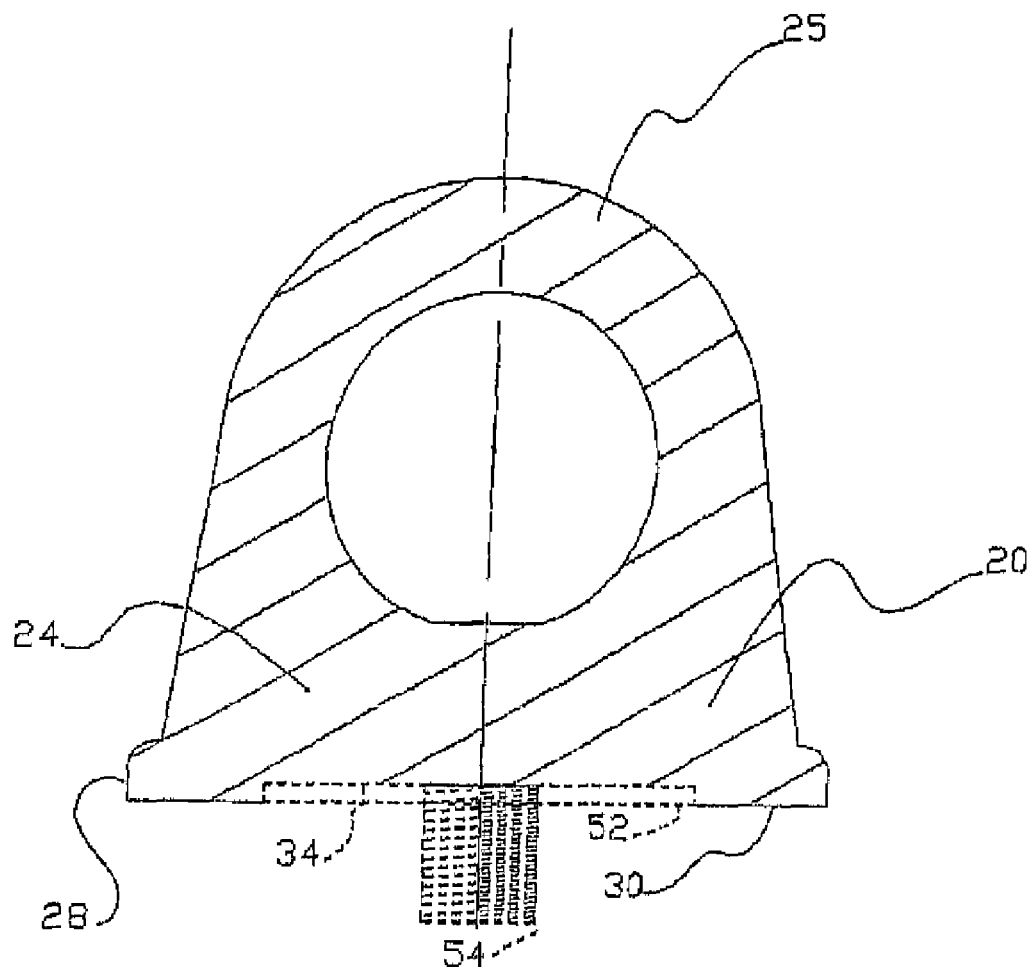
FIG. 9 is a cross-sectional view similar to FIG. 8 wherein the step in the bearing surface that defines the annular boss, and the location of the mounting stud are shown in phantom.

FIG. 9 illustrates in phantom lines the disk 52 of material that has been removed from the central region of the generally flat second side 30 as illustrated in FIG. 5 to form the embodiment of the flat second side 30 illustrated in FIG. 8. The central location of a suitable mounting stud is illustrated in phantom at 54 in FIG. 9.

Eyebolt assemblies according to the present invention lend themselves to use in a method of inventory control. According to this method of inventory control, a plurality of eyebolt bodies are provided. All of the eyebolt bodies have about the same nominal dimensions and include a base member with generally opposed bearing and lifting sides, a lifting loop integral with the base member, and a mounting element engaging member. The mounting element engaging member, for example, a threaded bore, is adapted to engagingly receive an eyebolt mounting component that projects generally axially from the base member and is opposed to the lifting loop. Several different eyebolt mounting components are provided. Each of said eyebolt mounting components has at least two mounting elements. A first of each of the mounting elements is adapted to engage with a mounting element engaging member associated with the eyebolt bodies. The first mounting elements are common to all of the eyebolt mounting components. Each of the eyebolt mounting components has at least a second mounting element. The second mounting element is adapted to engage a load. The variety of eyebolt mounting components in the inventory includes at least those with a first style of second mounting elements, and those with a second style of second mounting elements.

According to the present invention, the operator of the inventory method accepts a plurality of orders for different eyebolt assemblies. In response to a first of such orders, the operator selects any eyebolt body from the inventory, and selects an eyebolt mounting component that has a first style of second mounting element. Since the first mounting element on every eyebolt mounting component in the inventory will mate with every eyebolt body, there is no need to specially select for this combination. In response to a second of the plurality orders, the operator selects any eyebolt body from the inventory and an eyebolt mounting component that has a second style of second mounting element. An eyebolt body is assembled to each of the selected eyebolt mounting components responsive to the first and second orders. Preferably, the elements are releasably assembled together.

The eyebolt inventory control method according to the present invention lends itself to refurbishing pre-existing eyebolt assemblies. Existing eyebolts with permanently fixed mounting components, for example, threaded studs integral with the eyebolt body, can be removed and the eyebolt body drilled and tapped to accept a standard eyebolt mounting component. Also, where the elements have been previously releasably assembled together, they can be disassembled and new components combined to refurbish damaged assemblies, or to meet new mounting requirements.

What have been described are preferred embodiments in which modifications and changes may be made without departing from the spirit and scope of the accompanying claims. Clearly, many modifications and variations of the present invention are possible in light of the above teachings. It is therefore to be understood that, within the scope of the appended claims, the invention may be practiced otherwise than as specifically described.

What is claimed is:

1. An eyebolt assembly comprising: A skirt member, said skirt member being generally circular, having a longitudinal axis, bounded by a periphery, and including a first face, said first face being generally flat, a second face generally opposed to said first face, and a threaded socket element extending in said skirt member from said first face at least towards said second face; a reinforcement element integral with said second face and projecting generally outwardly from said second face generally parallel to said longitudinal axis, said reinforcement element including at least first and second bar members extending generally diametrically of said skirt member and intersectingly normal to one another in a generally plus shaped form, said second bar member including a striking face adjacent to and radially inward from said periphery, said striking face extending generally parallel to said longitudinal axis for a distance at least sufficient to be engaged by a manually controlled hammer; said first bar member including a lifting loop integral therewith, said lifting loop being generally opposed to said first face; and a threaded stud member, said threaded stud member being adapted to being threadably received in said threaded socket element and projecting generally normal to said first face and opposed to said lifting loop.

2. An eyebolt assembly of claim 1 wherein said first and second bar members include said striking faces.

3. An eyebolt assembly including a base member having first and second sides generally opposed to one another, bounded by an outer perimeter, and having a thickness between said first and second sides, said base member extending generally laterally and having a bearing surface on said first side, said bearing surface being generally flat, said base member having a generally central region, a threaded bore in said generally central region extending from said first side at least into said thickness, a lifting loop member integral with said base member in at least about said generally central region, said lifting loop member being opposed to and projecting generally normal to said bearing surface, at least 4 reinforcing rib members integral with said base member and extending from said second face generally normal to said bearing surface, said reinforcing rib members being arrayed generally radially from said generally central region and extending approximately to said outer perimeter, each of said reinforcing rib members presenting at least a striking face extending generally normal to said bearing surface, said striking faces being disposed adjacent to and radially inwardly from said outer perimeter and accessible from said second side, a cross-bore extending at least into a said reinforcing rib member and intersecting said threaded bore, said cross-bore being adapted to receiving a retainer pin element therein, a stud member adapted to being received in said threaded bore and to being retained there by pinning engagement with said retainer pin element, said stud member being double threaded with one threaded portion adapted to being threadably received in said threaded bore and a second threaded portion adapted to projecting generally normal to said bearing surface.

4. An eyebolt assembly according to claim 3 wherein said one and second threaded portions have different threads.

5. An eyebolt assembly according to claim 3 wherein said lifting loop member is an extension of a pair of said reinforcing rib members, the reinforcing rib members in said pair of reinforcing rib members being generally radially opposed to one another.

6. An eyebolt assembly according to claim 3 wherein said lifting loop member is an extension of a pair of said reinforcing rib members, the reinforcing rib members in said pair of reinforcing rib members being generally radially opposed to one another, said lifting loop member being generally symmetrical about a plane extending generally normal to said pair of reinforcing rib members and through said generally central region.

* * * * *